United States Patent [19]

Zucker

[11] 3,996,012
[45] Dec. 7, 1976

[54] CATALYTIC REACTOR HAVING DISK-SHAPED, ROTOR-STATOR, REACTION SURFACES

[75] Inventor: Friedrich J. Zucker, Norf, Germany

[73] Assignee: Hans Heinrich Auer, Oberbuschweg, Germany

[22] Filed: Dec. 18, 1974

[21] Appl. No.: 533,887

[30] Foreign Application Priority Data

Dec. 21, 1973 Germany .......................... 2363888

[52] U.S. Cl. .............................. 23/288 E; 208/143
[51] Int. Cl.² .......................... B01J 8/02; B01J 8/08
[58] Field of Search ............ 23/288 E, 288 R, 285; 208/143, 146; 260/690, 695

[56] References Cited

UNITED STATES PATENTS

| | | |
|---|---|---|
| 1,678,778 | 7/1928 | Harter ................. 23/288 E |
| 2,260,834 | 10/1941 | Everett ..................... 23/285 |
| 2,383,189 | 8/1945 | Hancock ............. 23/288 E X |
| 2,474,592 | 6/1949 | Palmer ................ 23/288 E X |
| 2,592,609 | 7/1971 | Honbo ................... 23/285 X |
| 2,909,634 | 10/1959 | Stratford ............ 23/288 E X |
| 3,356,461 | 12/1967 | Lynch et al. ............... 23/285 X |
| 3,497,327 | 2/1970 | Kehse ................... 23/288 R |
| 3,503,944 | 3/1970 | Wisseroth et al. ......... 23/288 R X |
| 3,639,652 | 2/1972 | Mommaerts et al. ........ 23/285 X |
| 3,767,535 | 10/1973 | Havewala et al. ........ 23/288 R X |
| 3,881,871 | 5/1975 | Porter ....................... 23/288 E |

*Primary Examiner*—Morris O. Wolk
*Assistant Examiner*—Bradley Garris
*Attorney, Agent, or Firm*—Diller, Brown, Ramik & Wight

[57] ABSTRACT

Apparatus for the continuous treatment of substances in flowable form in conjunction with a catalyst for carrying out chemical reactions, the apparatus including a rotor and a stator in opposed relationship defining between opposing working surfaces a reaction area with an inlet thereinto and an outlet therefrom, and the working surface of the rotor being in the form of a plurality of radially disposed lands and valleys with the lands including catalyst means for catalytically reacting with the substances during the rotation of the rotor.

16 Claims, 4 Drawing Figures

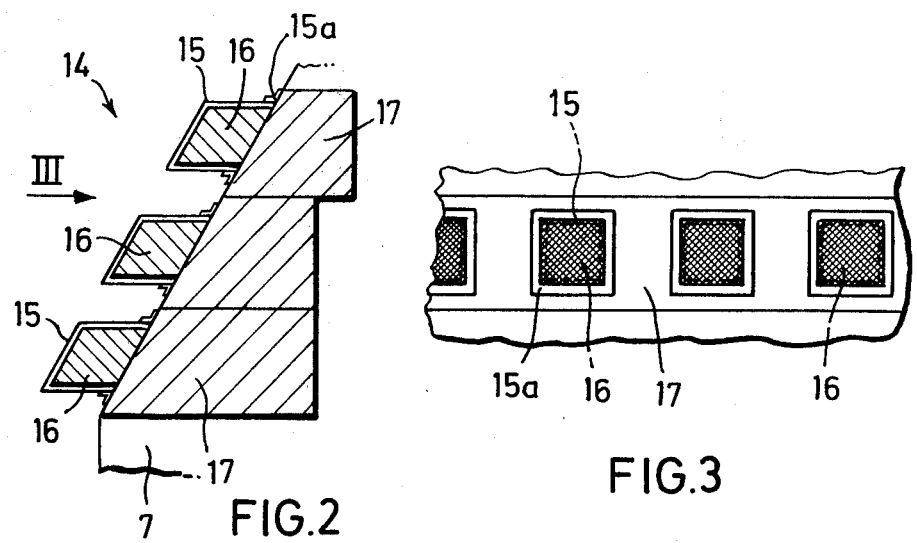
FIG.2
FIG.3
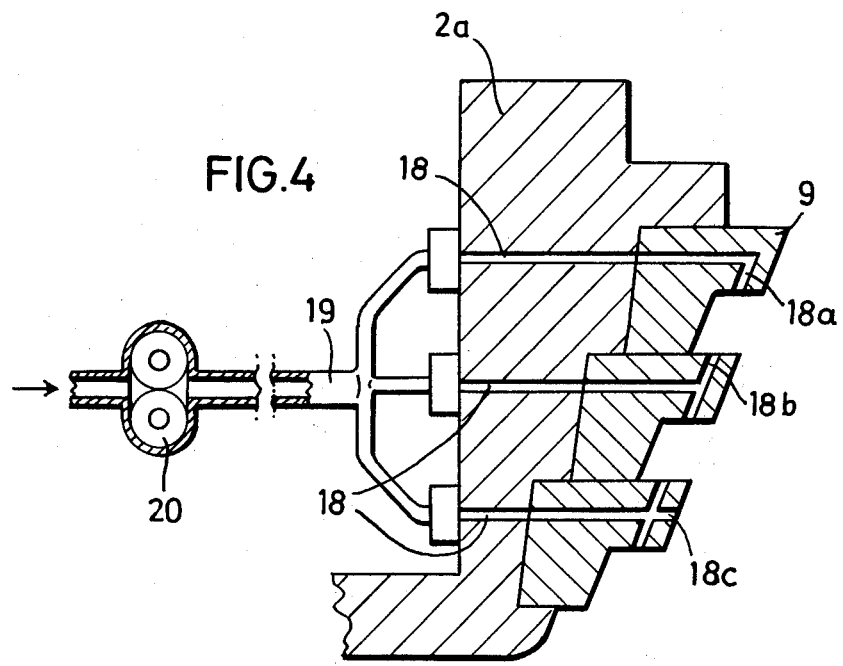
FIG.4

CATALYTIC REACTOR HAVING DISK-SHAPED, ROTOR-STATOR, REACTION SURFACES

This invention is directed to a novel apparatus for continuously treating substances in a flowable form and for carrying out chemical reactions using a catalyst, generally at elevated temperatures and under pressure beyond ambient.

Centrifugal homogenising machines are well known in which a rotor in a housing has ring like projections which rotate in opposition to gaps between rings on a face of an opposing stator. The material which is supplied into an area between the stator and rotor is mixed or comminuted if in a liquid or pasty state while in the preparation of emulsions or suspensions the solid and liquid phase thereof are intimately mixed together. In such conventional machines the material is generally introduced to the rotor at a central area and is forced through the area of the rotor and stator under the influence of centrifugal force and is thereby consequently continuously being exposed to a continuous beating and/or shearing action. The result is that an emulsion, dispersion or suspension is obtained. However, in such centrifugal devices generally no chemical reactions take place as a result of the apparatus per se and therefore the apparatus can be considered to be chemically neutral.

Many chemical reactions proceed at an adequate speed only in the presence of catalyst, for example, the catalytic hydrogenation of materials which can be hydrogenated and with which usually high temperature and superatmospheric pressure of pre-established values must be used. Such hydrogenating processes generally require the reactants to be supplied to a container in which they are brought into contact with a catalyst and after a predetermined time period the end product is withdrawn, further processed, etc. Conventional apparatus for carrying on catalytic processes are comparatively costly and with continued operation the catalysts generally loose their reaction speed and loss of activity due to the superficial depositions of resinous reaction products thereupon.

In keeping with the foregoing it is a primary object of the present invention to provide a novel apparatus for the continuous treatment of substances in a flowable form in conjunction with a catalyst to produce desired chemical reactions with the apparatus being less costly from a constructional standpoint than known apparatus but nevertheless permitting higher output with the activity of the catalyst being substantially unchanged during the process. These advantages are achieved by an apparatus of the centrifugal type in which a rotating rotor and a stationary stator are in opposed relationship to define therebetween a reaction area into which the substance which is to be admixed is fed, and the rotor includes lands carrying catalyst means for catalytically reacting with the substance during the rotation of the rotor whereby catalytical reaction takes place immediately in the shearing or impact zone produced by the rotating rotor and the opposing associated stator. More specifically, in carrying out heterogeneously catalyzed hydrogenation reactions the hydrogenation efficiency can be substantially improved over known systems because it is possible to operate with a less active catalyst within the substance because of the catalyst formed as a part of or being carried by the rotor itself. The substance or reaction mixture which is subjected to the apparatus may consist of material to be hydrogenated, hydrogen and a catalyst, as well as accompanying substances such as diluents for the material to be hydrogenated or the hydrogen gas, and these are subjected to rapid sequences of strong compressions and decompressions with simultaneous high shearing forces whereby the speed of catalytic hydrogenation reactions are considerably increased. In this way ultra-high pressures are available for the pressure hydrogenation within the system without it being necessary for high pressures to be introduced separately into the apparatus from the exterior. Consequently, the pressure loading is decreased compared to known systems and because of the sequence of alternating strong compressions and decompressions the overall apparatus housing is not subjected to the maximum pressure but to a much lower value somewhere between the maximum at optimum compression and the minimum at complete or low point decompression. By the rapid succession of high and low pressure within the apparatus the absorption of the compound to be hydrogenated along with the hydrogen on the catalyst can be considerably augmented. Furthermore, the rotating rotor causes a turbulence effect in the reaction mixture which occurs in shearing at impact zones promoted by cavitation-like impact phenomena which intensify the chemical reaction to a considerable extent. In addition, the shearing and impact action has the additional advantage to "clean" the catalyst in the reaction zone which becomes gummed up due to surface depositions of resinous reaction products or the like. Due to the fact that the compression within the shearing, impact or reaction zone is in turn immediately followed by a decompression any impurities of higher molecular weight which may perhaps form upon the catalyst are stripped thereoff and thus the catalyst always remains bright or bare and thus highly active to achieve optimum of chemical reactions.

The rotor and stator include working surfaces both of which are preferably constructed in the form of concentric rings to form lands and valleys, the lands of which may be provided with axially opening slots to define teeth which may consist wholly or in part of the catalytically active material. Through the entire rotor may be made from catalytically active material at least the lands or teeth are composed of catalytically active material or catalytically active material applied thereto. Some of the teeth may be composed as or have coated thereupon one type of catalytically active material whereas others of the teeth may be composed as or have coated thereupon a different type of catalytically active material depending, of course, upon the particular substance which is impelled by centrifugal force of the rotating rotor through the reaction zone. In the case of catalyst coatings the teeth may be provided with a layer of catalytic material by vapor coating, galvanic means, or by plating. More specially platinum, palladium, rhodium, iridium, ruthenium and osmium are to be considered for such catalysts, but also molybdenum, chromium and tungsten may be employed.

If the catalytically active material has not sufficient inherent strength to be subjected to the pressures of the centrifugal operation and might break down or disintegrate thereunder the rotor is preferably provided with a holder constructed of inert material within which is housed the catalyst. The holder may be, for example, a basket-like covering of steel, mesh or the like with the catalytic material being disposed therein in the form of a compressed element with the wire basket or the equivalent of a perforated sheet metal pocket being secured to the rotor.

The particular nature of the catalyst means depends upon the reactions which are to be carried out and, for example, oxides and sulphides of molybdenum and tungsten, possibly with the simultaneous use of hydrogen halides, are suitable as catalytically active materials for carbohydrogenation. Also to be considered are iron oxide compositions which contain iron oxide as an essential component, but in addition the oxides of other elements, such as magnesium, calcium, titanium, manganese, silicon, aluminum, as well as the alkali metals may be employed. In certain cases the catalytically active material cannot be compressed into relatively hard elements which will not disintegrate under load and centrifugal force, and in such cases the rotor and the teeth thereof are provided with port means through which the catalytically active material may be injected into the reaction area, and though the rotor may have such port means preferably the stator is so equipped to avoid problems concerning seals.

It is apropos to point out that though the chemistry and technology of hydrogenation have been known for many years one heretofore unsolved disadvantage thereof is the fact that known hydrogenation catalysts which are most effective are also most costly as, for example, the so-called hydrogenation metals. While hydrogenation with platinum usually proceeds considerably more quickly at lower temperatures than with other catalysts, nevertheless in general practice there is usually employed instead a less active but less costly catalyst as a compromise between activity and economy and therefore the problem heretofore existed of finding a process and/or apparatus which achieves an increase hydrogenation efficiency with a given catalyst or catalyst apparatus. In other words, the problem consists in finding an apparatus which makes possible for one to operate with a less active catalyst or catalyst system while maintaining a prescribed hydrogenation efficiency. This has been achieved by the novel apparatus of this invention due to the sequential compression and expansion heretofore described which is of particular significance with respect to carrying out heterogeneously catalyzed hydrogenation procedures. Moreover, particularly relative to the latter in such reactions catalysts which are present in solid form quickly loose their activity due largely to the superficial deposition of resinous reaction products thereupon which is known in technical jargon as "gumming up". However, this deleterious effect is avoided by the ultimate compression and decompression because any impurities of higher molecular weight which are formed on the catalyst are stripped therefrom.

Preferably the apparatus described heretofoe has three to five rings both on the rotor and stator which might, for example, include between 50 to 1500 teeth or lands per ring. The speed of rotation of the rotor must be sufficient to cause the desired compressions and expansions heretofore described, and the speed of rotation must be in the cavitation phenomena range which is usually between 500–7,000 r.p.m. In further keeping with this invention the catalytically active material, apart from that of the rotor, which is in a liquid or a pasty condition may be supplied to the reaction area at the rotor axis by means of a concentrically arranged tube in which the catalyst and other reactants are fed. In this case it is possible to also provide a return line for the discharged product so that a part of the product can pass several times in a cycle through the reaction zone so as to lengthen the resident time of the material to be treated by the catalytically active material of the rotor.

With the above and other objects in view that will hereinafter appear, the nature of the invention will be more clearly understood by reference to the following detailed description, the appended claimed subject matter, and the several views illustrated in the accompanying drawings.

IN THE DRAWINGS

FIG. 2 is a diagrammatic view of a portion of the rotor, and illustrates details of lands and valleys thereof with the lands being in the form of teeth formed from compressed catalytic material.

FIG. 3 is a developed view looking in the direction of the headed arrow III of FIG. 2, and illustrates the manner in which the compressed catalytic material is retained in position upon the rotor by meshed wire pockets.

FIG. 4 is a fragmentary sectional view taken through another stator of this invention, and illustrates the manner in which liquid or pasty catalytic material can be fed to the reaction area through teeth of the stator.

Figure 1:
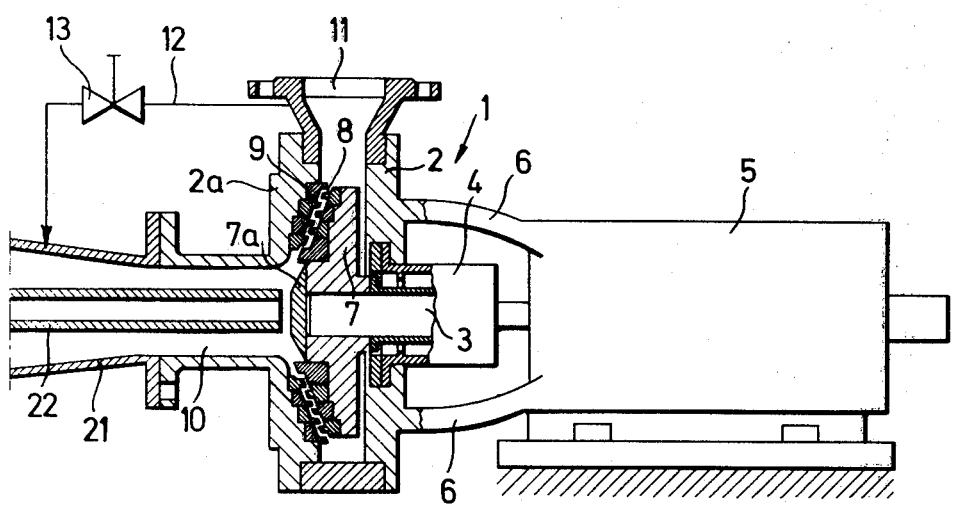
FIG. 1 is a diagrammatic view illustrating an apparatus of this invention, and particularly shows a rotating rotor and a stationary stator defining therebetween a reaction zone through which substance is alternately subject to compression and expansion.

A novel apparatus constructed in accordance with this invention is generally designated by the reference numeral 1 and includes a housing 2 joined by arms 6 to a housing 5 containing a motor (unnumbered) having a shaft 3 keyed to a rotor 7. The shaft 3 is mounted in suitable conventional bearings 4 and the rotor 7 carried thereby in turn carries a plurality of rings 8 (FIG. 1) or 17 (FIG. 2). The rotor opposes a plurality of rings 9 defining a stator carried by a housing portion 2a and between the rings 8 or 17 and the rings 9 is a reaction area of an undulating configuration which imparts sequential compression and decompression of reactive materials as they pass from an inlet 10 therethrough toward and through an outlet 11. If desired a bypass pipe or conduit 12 provided with a valve 13 may be used to selectively recirculate the material from the outlet back to the inlet 10 and through the reaction area between the stator 9 and the rotor 8 to increase the through-time of the material through the reaction area.

The rings 8 of the rotor 7 are in circular concentric relationship and each ring includes a land (unnumbered) projecting toward the stator 9 with a valley (unnumbered) between adjacent lands. In an alternative construction (FIG. 2) the rings 8 are replaced by the rings 17 and catalytic material 16 which is in compressed form is housed within pockets 15 of wire, perforated metal, or like material which in turn is secured to each ring 17 by strips or brackets 15a which completely surround the pockets 15 at the free terminal or base portions (unnumbered) thereof.

In the embodiment of the invention shown in FIG. 1 the rings 8 may be totally constructed of catalytic material or the lands only thereof may be constructed of catalytic material or an an alternative the lands may simply be provided with a coating of catalytic material. In the latter case the catalytically active material may be applied by plating, spraying or the like. However, in the embodiment of the invention illustrated in FIG. 2 it is assumed that the catalytically active material exists in such a phase that it can be compressed to form sufficiently rigid compressed elements, collectively indicated by the reference numeral 14, with each element 16 of the catalytically active material being held to the rings 17 of the rotor 7 by the mesh pockets 15 heretofore described.

If, however, the catalytically active material is more or less of a low viscosity phase (liquid or paste) the catalyst is supplied through bores 18 (FIG. 4) of the rings 9 of the stator which bores 18 may have branch passages 18a, 18b, 18c, etc. so that the catalytically active material can be supplied in sufficient quantity to all positions in the reaction area between the rotor 7 and the stator 9. The bores 18 are preferably connected to a distributor element or manifold 19 which communicates in a suitable manner to a pump 20 by which the catalytically active material is supplied under appropriate pressure into the shearing, impact, cavitation and/or reactlion zone between the rotor and stator. Both in connection with FIGS. 1 and 4 the reactants of the product to be treated are preferably supplied through separate supply pipes 21, 22 generally axially toward a face 7a of the rotor 7.

While preferred forms and arrangements of parts have been shown in illustrating the invention, it is to be clearly understood that various changes in detail and arrangement of parts may be made without departing from the spirit and scope of this disclosure.

I claim:

1. Apparatus for the continuous reaction of reactants in flowable form in conjunction with a catalyst for carrying out chemical reactions comprising a rotatable rotor and a stationary stator, said rotor and stator having axially opposing continuously spaced working surfaces defining therebetween an open reaction area, means for rotating said rotor, inlet means for delivering reactants axially into said reaction area, outlet means for delivering reactants from said reaction area, said rotor and stator working surfaces each being in the form of a plurality of radially spaced axially projecting lands and axially recessed valleys, said lands and valleys being in intermeshed relationship whereby upon rotation of said rotor the reactants are subjected to alternate compression and expansion while in and during the passage thereof radially through said reaction area, from the inlet means toward the outlet means, and a plurality of circumferentially spaced axially opening slots in said lands separating the latter into a plurality of circumferentially spaced teeth, selected ones of said teeth including catalyst means for contacting said catalyst with said reactants at said reaction area.

2. The apparatus as defined in claim 1 wherein said lands and valleys are of a stepped configuration as viewed in axial cross-section and are at an acute angle to a plane normal to the axis of rotation of said rotor.

3. The apparatus as defined in claim 1 wherein only said selected ones of said teeth include said catalyst means.

4. The apparatus as defined in claim 1 wherein said lands and valleys are generally concentric to each other and generally circularly disposed as viewed in axial plan.

5. The apparatus as defined in claim 1 including means for securing selected ones of said teeth including the catalyst means thereof to said rotor.

6. The apparatus as defined in claim 1 including apertured pocket means housing said selected ones of said teeth and said catalyst means thereof, and means for securing said pocket means to said rotor.

7. The apparatus as defined in claim 1 wherein said catalyst means is a coating carried by said selected ones of said teeth.

8. The apparatus as defined in claim 1 wherein said catalyst means includes port means in said selected ones of said teeth for delivering catalyst material into said reaction area.

9. The apparatus as defined in claim 1 wherein said lands and valleys are generally circularly disposed as viewed in axial plan.

10. The apparatus as defined in claim 9 wherein said lands and valleys are of a stepped configuration as viewed in axial cross-section and are at an acute angle to a plane normal to the axis of rotation of said rotor.

11. The apparatus as defined in claim 9 including means for securing said selected ones of said teeth including the catalyst means thereof to said rotor.

12. The apparatus as defined in claim 9 including apertured pocket means housing said selected ones of said teeth and the catalyst means thereof, and means for securing said pocket means to said rotor.

13. The apparatus as defined in claim 9 wherein only said teeth include said catalyst means.

14. The apparatus as defined in claim 13 wherein said lands and valleys are of a stepped configuration as viewed in axial cross-section and are at an acute angle to a plane normal to the axis of rotation of said rotor.

15. The apparatus as defined in claim 13 including means for securing said selected ones of said teeth including the catalyst means thereof to said rotor.

16. The apparatus as defined in claim 13 including apertured pocket means housing said selected ones of said teeth and the catalyst means thereof, and means for securing said pocket means to said rotor.

* * * * *